Sept. 10, 1968   J. MAY   3,400,828
RACK FOR SLENDER ARTICLES
Filed Dec. 12, 1966
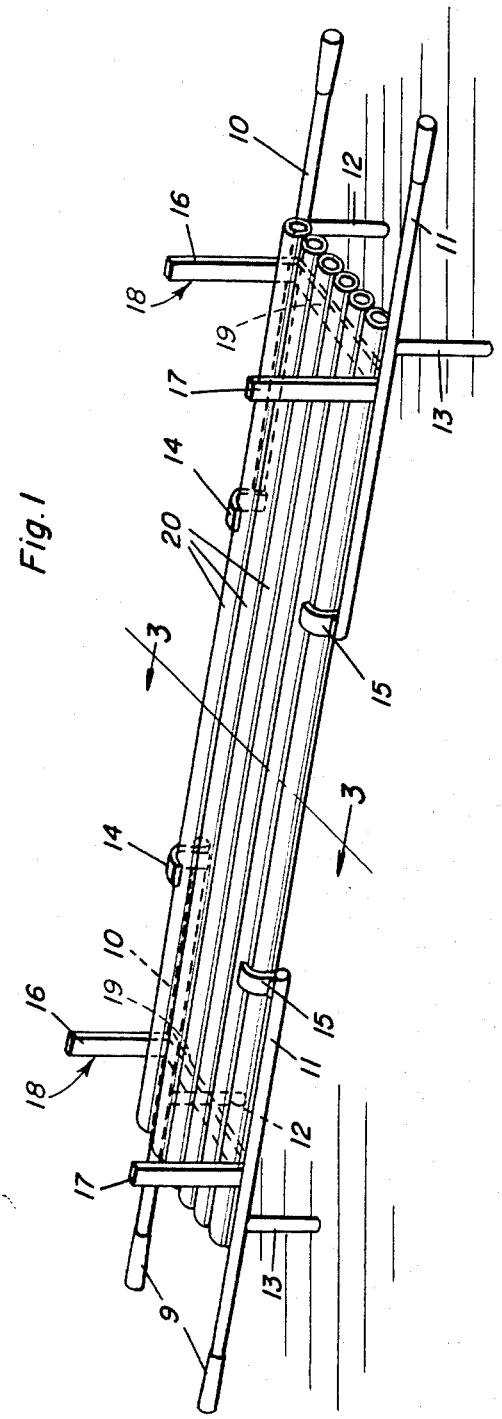
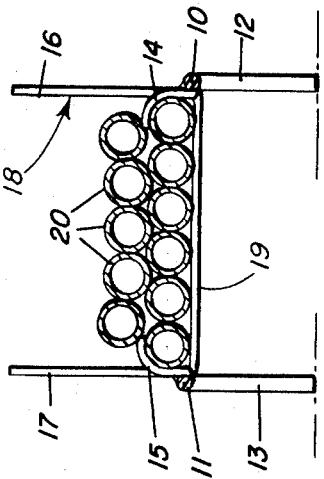
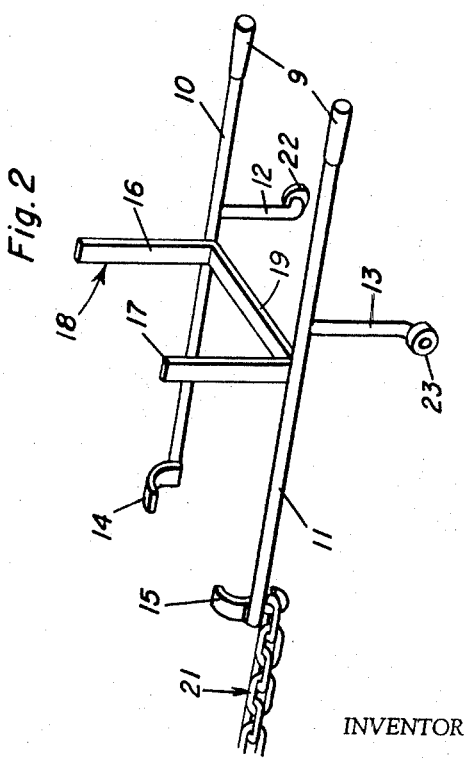
INVENTOR
James May
BY Stevens, Davis, Miller & Mosher
ATTORNEYS

United States Patent Office 3,400,828
Patented Sept. 10, 1968

3,400,828
RACK FOR SLENDER ARTICLES
James May, Rte. 1, Louisburg, N.C. 27549
Filed Dec. 12, 1966, Ser. No. 600,931
6 Claims. (Cl. 211—60)

ABSTRACT OF THE DISCLOSURE

A holder and transporter for slender articles of great length including two identical units, each of which has parallel integrally connected arm members serving as both hand holds and pipe-gripping means. The pipes are supported between the holders with two pipes being gripped thereby to form a portion of the transporter itself.

---

The present invention relates to a device for storing and transporting loads of pipes and other slender articles whose longitudinal length is substantially greater than its diameter.

There has been a long-felt need in the agricultural area of endeavor for means whereby articles, such as irrigation pipe, trellis lattice, and the like, may be readily transported across fields and other rough areas to the point where they will be employed. It frequently may not be desirable to take a vehicle into such a field because of the possible resulting destruction of crops growing therein. Therefore, it is necessary for agricultural workers to manually transport the irrigation pipe, etc. to the desired location. This raises a problem in that a single agricultural worker or a pair of workers would only be able to transport a limited number of units during each trip into the field.

Therefore, it is an object of the present invention to provide a device whereby a team of workers may readily transport a large load of slender articles with a single trip.

It is another object of the present invention to provide a device for transporting slender articles which may be readily and economically produced.

The means for accomplishing the foregoing objects and other advantages, which will be apparent to those skilled in the art, are set forth in the following specification and claims and are illustrated in the accompanying drawings dealing with a basic embodiment of the present invention. Reference is made now to the drawings in which:

FIG. 1 is a perspective view of the subject invention with a load of pipe mounted thereon;

FIG. 2 is a perspective view of one unit of the subject invention showing the individual features thereof; and FIG. 3 is a section view taken along line 3—3 of FIG. 1.

The inventive transporter and holder comprises a pair of units, each of which has a pair of parallel spaced arm members 10 and 11 having depending leg portions 12 and 13, respectively. On one end of the members 10 and 11, there is a handgrip 9. Inwardly directed arcuate gripping means 14 and 15 are mounted on the opposite ends of members 10 and 11, respectively. Approximately in the middle of the members 10 and 11, there is mounted a U-shaped frame 18 having upstanding guide portions 16 and 17 and cross-bar portion 19.

In operation, the device is assembled by placing the two units substantially in line with the gripping means directed towards each other. The articles, such as pipes 20, are then aligned with the units so that the cross-bar portion 19 is beneath the pipes with the gripping means 14 and 15 encompassing the upper portion of the article in a gripping engagement. The side articles are first positioned so that the carrier forms a stretcher-like configuration. The remaining articles of the load are then placed on the units between the upright guide portions 16 and 17, as shown in FIG. 3.

When a load is to be transported, the handgrips 9 are lifted thus clamping the side articles by the lever action about cross-bar portion 19, which serves as a fulcrum, resulting in a downward force on the engaging means 14 and 15. It will thus be possible for two workers to transport large loads of articles in a single trip.

The present invention is subject to numerous modifications amongst which would be the provision of a means 21. Such as a hook-and-chain arrangement, to provide adjustable connection betwen the two units. With such an arrangement, there would be assurance that the two units would not be inadvertently separated during transport so that the articles would slide past the cross-bar portion 19 to thus become disengaged from the assembled unit.

A further modification would be the addition of wheels 22 and 23, respectively, to the bottom of leg members 12 and 13. If such an adjustable means, such as mentioned above, were provided and wheels were also provided, then a single worker could transport a large load if the path of travel was along a fairly smooth, hard surfaced terrain.

The present invention may be embodied in other specific forms with out departing from the spirit or essential characteristics thereof. The present embodiment is therefore to be considered in all respects as illustrative and not restrictive, the scope of the invention being indicated by the appended claims rather than the foregoing description and all changes which come within the meaning and range of equivalency of the claims are therefore to be embraced herein.

What is claimed is:
1. A device for transporting and storing a number of slender articles comprising a pair of like units each of which comprises a pair of spaced parallel members, means interconnecting said members at a point substantially in the middle thereof, means on one end of each said parallel member for clampingly engaging with one of said articles, handgrip means on the opposite end of said parallel side members, upstanding side retaining members on each said side members, and leg means depending from each said parallel side member at a point between said handgrip means and said interconnecting means.

2. In combination with a plurality of pipes or similar articles which are slender with respect to their overall length comprising a pair of parallel spaced side members, means interconnecting said side members, guide means projecting vertically upwardly from each said side member, means on one end of said side members for grippingly engaging with said article, handgrip means on the opposite ends of said side members, leg means depending from said side members between said handgrip means and said interconnecting means, said device being assembled with one of said articles adjacent each said side member so that an end portion thereof rests on said means interconnecting said side portions and said engaging means encompasses an upper portion thereof.

3. A device according to claim 2 wherein said gripping means comprises an arcuate member projecting upwardly and inwardly of said side member, said arc being of sufficient length to substantially encompass at least half of the article to be transported.

4. A device according to claim 2 wherein means are provided for adjustably interconnecting each said unit.

5. A device according to claim 2 wherein wheel means are provided on each said leg portion.

6. In combination with a plurality of pipes and other similar slender articles to be transported and stored, a pair of like units each of which comprises a pair of parallel spaced side members, a substantially U-shaped member interconnecting said side members with said U opening upwardly of said members, arcuate gripping means extending upwardly and inwardly from one end of each said side member, handgrip means on the opposite end of each said side member, leg means depending from each said side member between said handgrip means and said U-shaped member, said units and said pipes being assembled so that one pipe is positioned on each side of each said unit with an end portion resting on said U-shaped channel member and said arcuate member gripping an adjacent portion of said pipe whereby an upwardly directed force on said handgrip means will provide a torque force about said U-shaped member to apply a downward force on said gripping means to positively engage said pipes.

References Cited

UNITED STATES PATENTS

| | | | |
|---|---|---|---|
| 2,947,458 | 8/1960 | Troendly | 224—45 |
| 3,161,296 | 12/1964 | Sartor | 211—60 |
| 3,278,042 | 10/1966 | Frydenberg | 211—60 |

ROY D. FRAZIER, *Primary Examiner.*

J. F. FOSS, *Assistant Examiner.*